May 15, 1956     D. HERMANN     2,745,642
MIXING CONSTRUCTION
Filed Oct. 28, 1953

INVENTOR.
DICK HERMANN
BY *Joseph Rosen*
ATTORNEY ized Statof Pff2,745,642
United States Patent Office Patented May 15, 1956

2,745,642
MIXING CONSTRUCTION
Dick Hermann, La Canada, Calif.

Application October 28, 1953, Serial No. 388,824

4 Claims. (Cl. 259—72)

This invention relates to a mixing device. More specifically, this invention relates to a mixing construction formed of two substantially hemispherical receptacles which are adapted to be joined together to form a substantially spherical container adapted for mixing salad greens and vegetables with dressing or for mixing other materials such as drinks, high-balls, and the like.

Figure 1:
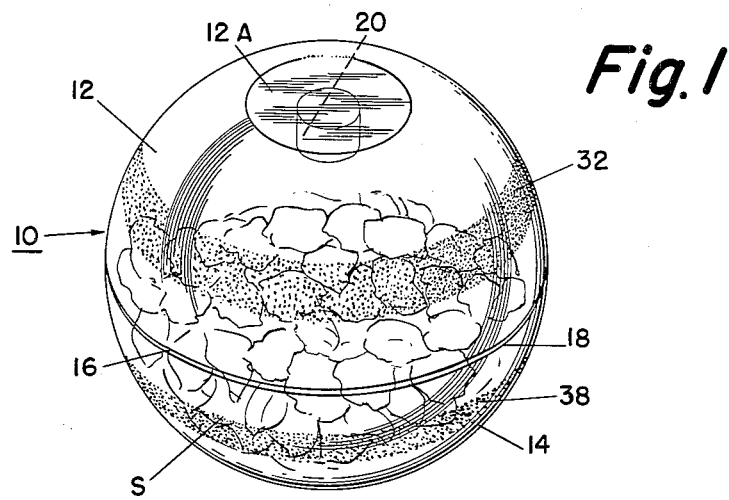
Figure 2:
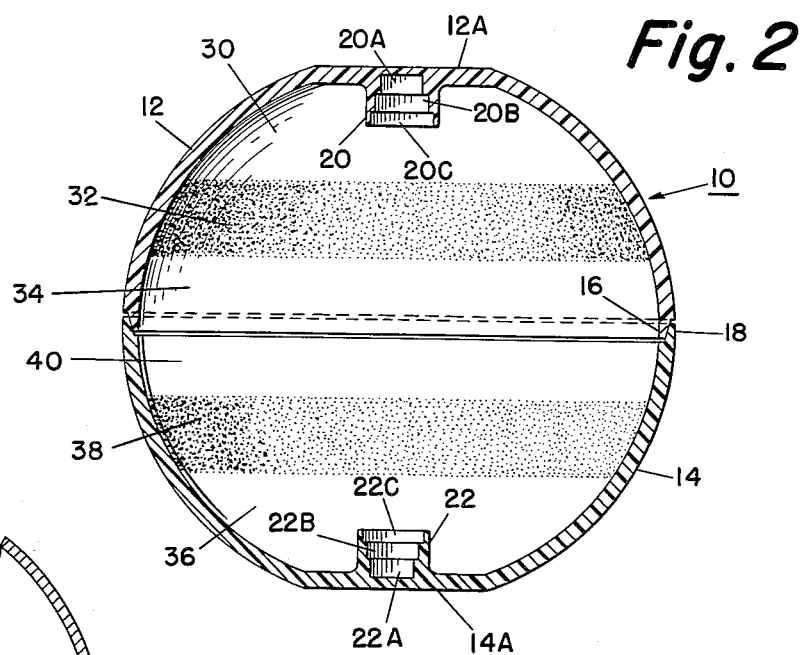
Figure 3:
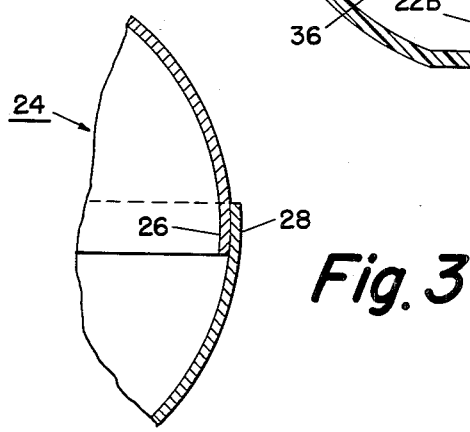

Further details and advantages of my invention will be apparent from the following specification and appended drawings, wherein Figure 1 is a perspective view of my mixing construction, Figure 2 is a vertical sectional view of Figure 1, and Figure 3 is a fragmental sectional view of a modified construction of my mixing construction.

Referring to the drawings, the mixing device 10 is formed of two substantially hemispherical receptacle portions 12 and 14 which may be made of any suitable material, such as synthetic resin, metal or glass. I prefer to make the receptacle portions of transparent plastic material so that the contents may be visible during use of the device. The receptacle portions are made of the same dimensions and shape so as to be interchangeable and complemental to each other. The free edges of the receptacle portions 12 and 14 are provided respectively with mating tongue and groove 12 and 14 are provided respectively with mating tongue and groove portions 16 and 18, respectively, which are adapted to interlock so as to form a liquid-tight seal when the two receptacle portions 12 and 14 are brought together, as shown in Figure 1, to form a substantially spherical container 10. The top and bottom portions of the receptacle portions 12 and 14 are preferably flattened at 12A and 14A, respectively, so as to permit the separate sections to stand on a flat surface such as a table without spilling the contents.

Each of the receptacle portions 12 and 14 is provided with an integral cup portion 20 and 22, respectively, which are adapted to receive a measure definite volume of liquid therein. The cup portion 20 may be provided with stepped portions 20A, 20B and 20C to provide aliquot portions for measuring a definite quantity of liquid. Similarly cup portion 22 is provided with stepped portions 22A, 22B and 22C. These aliquot portions are also preferably of a predetermined volume in relation to the total volume of each receptacle portion as well as to aliquot portions thereof as indicated by portions 30, 32 and 34 of receptacle portion 12 and portions 36, 38 and 40 of receptacle portion 14.

In using the mixing device for preparing salads, for example, a measured amount of salad dressing is placed in the cup portion 22, the vegetables and greens S are then placed in the receptacle 14, the other receptacle portion 12 is then positioned into locking engagement with receptacle portion 14 and the assembled unit is gently shaken so as to distribute the dressing uniformly on all of the salad green surfaces. The cup portions 20 and 22 also serve as mixing baffles for agitating and turning the salad greens so as to uniformly spread the dressing on all surfaces of the greens. The upper receptacle portion 12 is then removed and the salad is ready to be served from the receptacle portion 14.

The capacity of the mixing device may be of any predetermined suitable volume so as to make a salad for one or more persons as desired. For example, by filling the portion 36 of receptacle 14 up to the band 38 and using dressing only to fill cup portion 22A only two servings of salad can be made. By filling the portions 36 and 38 of the receptacle 14 and the cup to the second step 22B, four salad portions can be prepared. Similarly, by filling the entire receptacle and cup portion, six salad servings may be prepared.

It will thus be seen that my mixing device makes it possible to prepare salad greens with a definite amount of dressing which is also evenly and uniformly spread on the entire mass of greens. The greens will not be bruised since they are gently tumbled in my device. No spilling over of oily greens will occur during mixing as usually happens when tossing with fork and spoon, often causing staining of the tablecloth. Also less dressing can be used since the dressing will not settle in any one position during mixing. The greens will therefore be completely coated with dressing and no dressing will be wasted. When my device is used outdoors the two receptacle portions can be left joined together between servings to prevent insects and dust from contacting the salad.

If desired, I may provide the inner surface of each receptacle portion 12 and 14 with abrading bands 32 and 38, respectively, integrally formed with the inner surface thereof by providing small protruding portions in the inner surface of the receptacle portion. Such abrading surface can be used to rub pieces of garlic, onion, lemon and the like.

The two receptacle portions 12 and 14 may be interlocked to form a leakproof joint in any other suitable manner. For example, as shown in Figure 3, the mixing device 24 may be made of two hemispherical receptacle portions formed of thin aluminum or copper having slightly flexible free edges 26 and 28 which can be overlapped into tight frictional engagement.

It is obvious that my mixing device may be used to prepare mixtures of other foods as well as drinks. For example, it is possible to prepare drinks and high-balls by using the cups for measuring the desired ingredients in predetermined proportions.

It is to be understood that changes and modifications may be made in my construction which are intended to be included in the appended claims.

I claim:

1. A mixing device comprising two complemental substantially hemispherical receptacle portions, the free edges of said receptacle portions being provided with interengaging portions for removably locking said receptacle portions into a single unitary substantially spherical container, the bottom portion of at least one of said receptacle portions being provided with an integral open measuring cup facing and extending toward the other complemental hemispherical receptacle portion.

2. A mixing device as defined in claim 1, wherein the measuring cup is provided with stepped internal surfaces to measure aliquot volumes in relation to the volume of said hemispherical receptacle portion.

3. A mixing device as defined in claim 1, wherein the inner surface of each receptacle portion is provided with an abrading band.

4. A mixing device as defined in claim 1, wherein the receptacle portion is flattened at the base of said cup portion for supporting said receptacle portion.

References Cited in the file of this patent

UNITED STATES PATENTS

| 55,807 | Bemis | June 26, 1866 |
| 1,713,979 | Redmond | May 21, 1929 |
| 2,577,185 | Easton | Dec. 4, 1951 |
| 2,618,143 | McConaughy | Nov. 18, 1952 |

FOREIGN PATENTS

| 673,137 | Great Britain | June 4, 1952 |